(12) United States Patent
Nambu et al.

(10) Patent No.: US 6,168,863 B1
(45) Date of Patent: Jan. 2, 2001

(54) METAL CHELATE-FORMING FIBERS, PROCESS FOR PRODUCING THE SAME, PROCESS FOR SEQUESTERING WITH THE SAME, AND FILTER PRODUCED THEREFROM

(75) Inventors: Nobuyoshi Nambu; Osamu Ito; Shiho Sato, all of Yokkaichi (JP)

(73) Assignees: Chelest Corporation; Chubu Chelest Co., Ltd., both of Osaka (JP)

( * ) Notice: Under 35 U.S.C. 154(b), the term of this patent shall be extended for 0 days.

(21) Appl. No.: 09/422,666

(22) Filed: Oct. 22, 1999

Related U.S. Application Data

(63) Continuation of application No. PCT/JP98/01835, filed on Apr. 21, 1998.

(30) Foreign Application Priority Data

Jan. 22, 1997 (JP) .................................... 9-104996

(51) Int. Cl.[7] ............................ D02G 3/00; D06M 13/00; D01F 6/00
(52) U.S. Cl. .......................... 428/364; 428/375; 428/393; 8/120; 8/194; 8/196
(58) Field of Search ............................. 8/120, 194, 196; 428/364, 393, 375

(56) References Cited

U.S. PATENT DOCUMENTS

| | | | |
|---|---|---|---|
| 3,033,698 | * 5/1962 | Kiefer et al. | 106/196 |
| 3,038,780 | * 6/1962 | Kiefer et al. | 18/54 |
| 3,068,063 | * 12/1962 | Kiefer et al. | 18/54 |

(List continued on next page.)

FOREIGN PATENT DOCUMENTS

| | | |
|---|---|---|
| 0962582 | 12/1999 | (EP) . |
| 962582 | * 12 1999 | (EP) . |

| | | |
|---|---|---|
| 49-36591 | 4/1974 | (JP) . |

(List continued on next page.)

OTHER PUBLICATIONS

Derwent Abstract WO 9816680A, Apr. 1998.*
Derwent Abstract WO9848098A, Oct. 1998.*
Derwent Abstract JP52008121A, Jan. 1977.*
Derwent Abstract Jp69003278B, Undated.*
Derwent Abstract TW221701A, Mar. 1994.*

(List continued on next page.)

*Primary Examiner*—Newton Edwards
*Assistant Examiner*—J. M. Gray
(74) *Attorney, Agent, or Firm*—Smith Patent Office

(57) ABSTRACT

The present invention provides a novel fibrous chelate-forming material to which a capability of forming a chelate with metal is imparted by introducing a specific acyl group represented by the following general formula [1] or [2], and also discloses a novel process for producing a chelate-forming fiber, a process for sequestering with the same, and a filter capable of simultaneously removing impurities and metal ions in a fluid is imparted using the chelate-forming fiber.

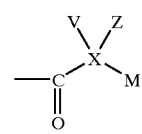

[1]

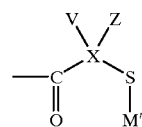

[2]

[wherein each symbol is as defined in the specification.]

11 Claims, 6 Drawing Sheets

U.S. PATENT DOCUMENTS

| | | | | |
|---|---|---|---|---|
| 4,366,085 | * | 12/1982 | Ikegami et al. | 252/431 |
| 4,772,455 | * | 9/1988 | Izumi et al. | 423/210 |
| 5,575,915 | * | 11/1996 | Nakamura et al. | 210/631 |
| 5,672,418 | * | 9/1997 | Hansen et al. | 428/283 |

FOREIGN PATENT DOCUMENTS

| | | |
|---|---|---|
| 3152272 | 6/1991 | (JP) . |
| 6-316811 | 11/1994 | (JP) . |
| 7112128 | 5/1995 | (JP) . |
| 9-248570 | 9/1997 | (JP) . |
| WO98/16680 | * 4/1998 | (WO) . |
| WO98/48098 | * 10 1998 | (WO) . |

OTHER PUBLICATIONS

Derwent Abstract DD140565A, Mar. 1980.*
Derwent Abstract JP57059635A, Apr. 1982.*
Derwent Abstract JP04122499A, Apr. 1992.*

* cited by examiner

METAL CHELATE-FORMING FIBERS, PROCESS FOR PRODUCING THE SAME, PROCESS FOR SEQUESTERING WITH THE SAME, AND FILTER PRODUCED THEREFROM

This is a continuation of International Application PCT/JP98/01835, with an international filing date of Apr. 21, 1998, now pending.

BACKGROUND OF THE INVENTION

1. Field of the Invention

The present invention relates to a fiber having a capability of forming a metal chelate, a process for producing the same, a method for sequestering metal ions with the same, and a filter to which a performance of removing impurities and metal ions in a fluid is imparted using the fiber as a filter material. This fiber can be widely utilized for purification of various fluids, for example, aqueous fluids including factory waste water, potable water, etc., non-aqueous fluids including edible oil and fat, etc. and gases including air, etc. because of its efficient performance of capturing a trace amount of metal ions contained in water, for example, harmful heavy metal ions including copper, zinc, nickel, cobalt, etc. even in a low pH range.

2. Description of the Prior Art

Various harmful metal ions are sometimes contained in industrial exhaust water and must be sufficiently removed by a waste water disposal in view of prevention of environmental pollution. There are many metal ions which can be utilized effectively as heavy metals and it serves double purposes to utilize them as a secondary resource after separation and recovery.

Heretofore, an ion exchange resin has widely been utilized to remove metal ions in exhaust water, but its effect of selectively adsorbing and capturing low concentration of metal ions is not sufficient necessarily. A chelate resin having a property of forming a chelate with heavy metal ions has also been utilized effectively to remove harmful heavy metals in the field of water treatment because of its particularly excellent selective capturing property to heavy metal ions.

However, almost all of these known chelate resins are beads-like or granular resins wherein iminodiacetic acid skeletons are introduced into a polycondensate having a rigid three-dimensional crosslinked structure, such as styrene-divinylbenzene resin, phenol-formaldehyde resin, etc. and a rate of diffusion and permeation of metal ions or regenerants into the resin is small and, therefore, a treatment efficiency is low. To enhance the rate of capturing or regeneration of metal ions by enhancing the rate of diffusion and permeation of the metal ions or regenerants, there has been proposed a method of reducing a particle diameter of the chelate resin thereby to enhance a surface area and to enhance a contact effective area with a fluid to be treated. However, since the particle diameter of the chelate resin must be reduced, not only handling becomes troublesome due to scatter of the chelate resin, but also a resistance to liquid passage of a layer filled with a chelate resin increases on water treatment and the treatment efficiency is lowered. In the case of disposal of the used chelate resin whose regenerating capability is lost, problems such as difficulty in incineration and complicated volume reduction had been pointed out for beads-like or granular chelate resin.

Under these circumstances, the present invention has been accomplished and an object of the present invention is to provide a novel fibrous chelate-forming material which has an excellent metal chelate-forming capability and can easily performing a regenerating treatment or disposal after use, and to establish a process for producing the fiber. Another object of the present invention is to provide a method for efficiently capturing metal ions contained in aqueous or non-aqueous liquids, or gases such as exhaust gas, etc. using the fiber. Still another object of the present invention is to provide a filter which can simultaneously remove insoluble impurities and metal ions contained in a fluid using the chelate-forming fiber as a filter material.

SUMMARY OF THE INVENTION

The present invention provides a technique which can efficiently adsorb and remove metalloid elements and compounds thereof from water and various exhaust gases, or which can efficiently uptake and recover them.

The metal chelate-forming fiber according to the present invention, which could have solved the above problems, refers to a metal chelate-forming fiber which has, in a fiber molecule, an acyl group represented by the following general formula [1] or [2]:

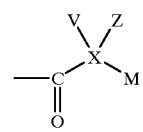

[1]

wherein X represents a residue in which one carboxyl group is eliminated from monocarboxylic acid or dicarboxylic acid;

V represents hydrogen or a carboxyl group;

Z represents hydrogen or has the same meaning as that of M, with the proviso that Z and M are the same or different;

M represents hydrogen; or

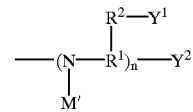

wherein $R^1$ represents a residue in which one hydrogen is eliminated from a carbon chain in an alkylene group, $R^2$ represents a direct bond or an alkylene group, $Y^1$ and $Y^2$ are the same or different and each represents hydrogen, a carboxyl group, an amino group, a hydroxy group or a thiol group, n is an integer of 1 to 4, M' represents hydrogen or

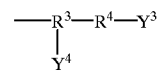

wherein $R^3$ represents a residue in which one hydrogen is eliminated from a carbon chain in an alkylene group, $R^4$ represents a direct bond or an alkylene group, and $Y^3$ and $Y^4$ are the same or different and each represents hydrogen, a carboxyl group, an amino group, a hydroxy group or a thiol group;

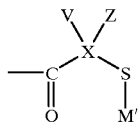

wherein V, X, Z and M' are as defined above.

DETAILED DESCRIPTION OF THE PREFERRED EMBODIMENTS OF THE INVENTION

Figure 1:
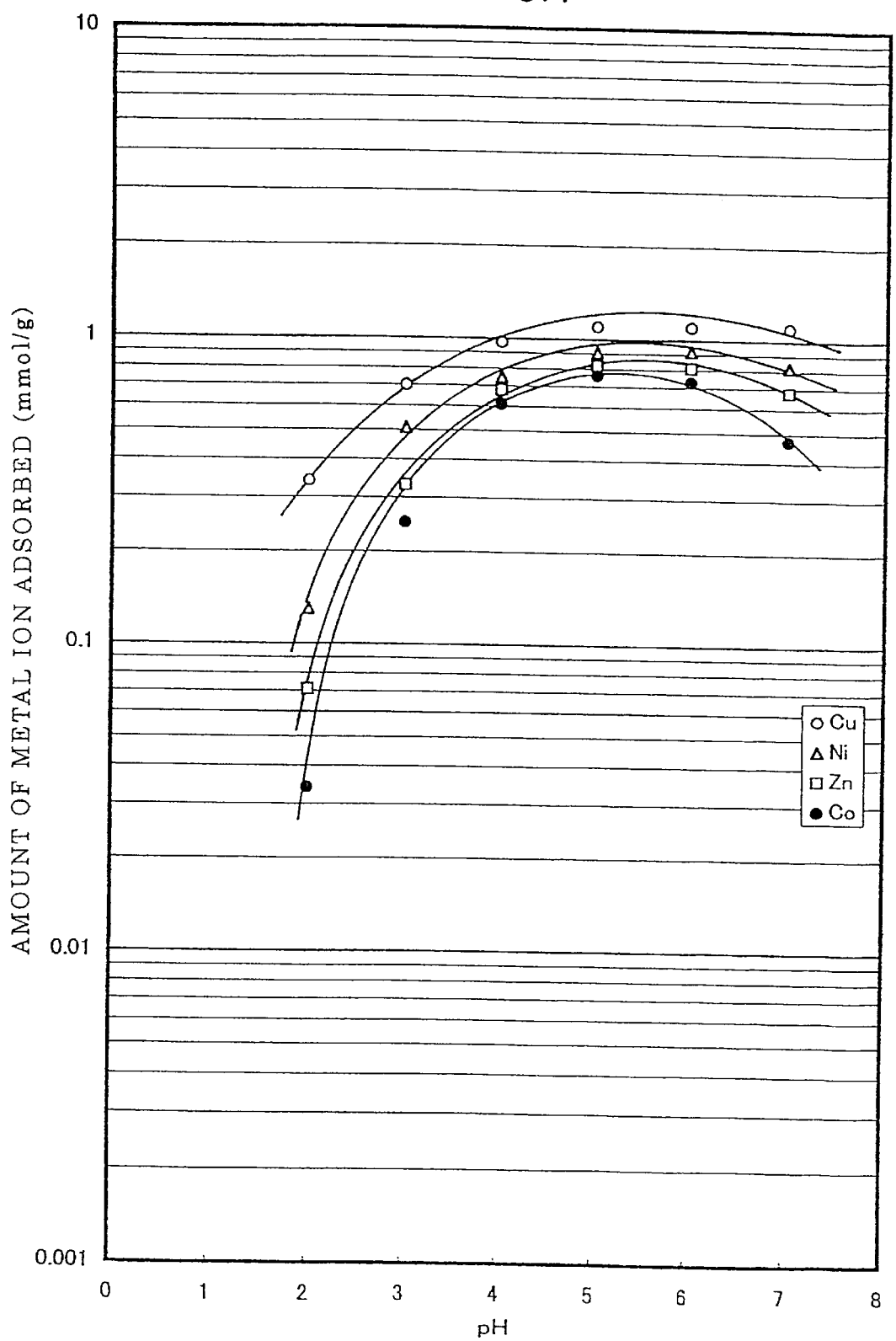
FIG. 1 is a graph showing the results of a metal ion capturing test of the chelate fiber A obtained in the example.

The metal chelate-forming fiber according to the present invention, which could have solved the above problems, refers to a metal chelate-forming fiber which has, in a fiber molecule, an acyl group represented by the following general formula [1] or [2]:

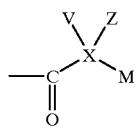

wherein X represents a residue in which one carboxyl group is eliminated from monocarboxylic acid or dicarboxylic acid;

V represents hydrogen or a carboxyl group;

Z represents hydrogen or has the same meaning as that of M, with the proviso that Z and M are the same or different;

M represents hydrogen; or

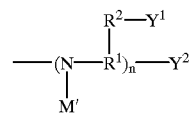

wherein $R^1$ represents a residue in which one hydrogen is eliminated from a carbon chain in an alkylene group, $R^2$ represents a direct bond or an alkylene group, $Y^1$ and $Y^2$ are the same or different and each represents hydrogen, a carboxyl group, an amino group, a hydroxy group or a thiol group, n is an integer of 1 to 4, M' represents hydrogen or

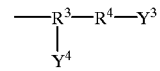

wherein $R^3$ represents a residue in which one hydrogen is eliminated from a carbon chain in an alkylene group, $R^4$ represents a direct bond or an alkylene group, and $Y^3$ and $Y^4$ are the same or different and each represents hydrogen, a carboxyl group, an amino group, a hydroxy group or a thiol group; and

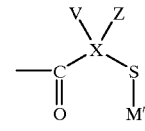

wherein V, X, Z and M' are as defined above.

In the above general formulas, particularly preferred examples of the alkylene group in the "residue in which one hydrogen is eliminated from a carbon chain in an alkylene group" represented by $R^1$ and $R^3$ include lower alkylene groups having 1 to 6 carbon atoms. Among them, methylene is particularly preferred.

The "direct bond or an alkylene group" represented by $R^2$ and $R^4$ includes, for example, direct bond or lower alkylene groups having 1 to 6 carbon atoms. Among them, direct bond or methylene group is particularly preferred.

$Y^1$ to $Y^4$ are the same or different and each represents hydrogen, a carboxyl group, an amino group, a hydroxy group or a thiol group. Among them, carboxyl group is particularly preferred.

The fiber as a base of the chelate-forming fiber includes, for example, natural fibers or regenerated fibers of vegetable or animal, or various synthetic fibers.

The process according to the present invention specifies a process capable of producing the chelate-forming fiber as described above in a simple and efficient manner, which comprises reacting a fiber having, in a molecule, a functional group, which is reactive with an acid anhydride group having a reactive double bond, and further reacting the reaction product with a metal chelate-forming compound.

Preferred examples of the functional group, which is reactive with the acid anhydride, contained in the fiber molecule include hydroxyl group, amino group, imino group, glycidyl group, isocyanate group, aziridinyl group, thiol group and the like. These functional groups may be groups contained originally in the fiber, or those introduced by modification.

Preferred compound to be used to impart the metal chelate-forming capability includes, for example, compounds which have a reactivity with a reactive double bond and also have at least one group capable of exhibiting a chelate-forming property selected from the group consisting of amino group, imino group and thiol group. Among them, a compound having, in a molecule, a carboxyl group, together with an amino group, an imino group or a thiol group, is particularly preferred.

When the chelate-forming fiber is brought into contact with a fluid containing metal ions, the metal ions in the fluid can be efficiently captured as a chelate, thereby making it possible to effectively utilize as a method for removing or capturing metal ions. Furthermore, when using this chelate-forming fiber as a constituent material of a filter, insoluble impurities and metal ions contained in a fluid can be efficiently removed. Therefore, this filter can be utilized as a filter for purification of various fluids, very effectively.

As described above, the chelate-forming fiber of the present invention is a fiber having, in a fiber molecule, an acyl group(s) represented by the general formulas [1] and/or [2] as a chelate-forming functional group, and a metal chelate-forming functional group such as carbonyl group and N or S and, more preferably carboxyl group, which are contained in the acyl group, forms a chelate with metal ions, thereby to exhibit a function of capturing the metal ions.

The acyl group constituting such a chelate-forming functional group may be any one which contains N or S, together with a carbonyl group, as described above. Among them, an acyl group having a carboxyl group, together with a carbonyl group and N or S, is particularly preferred.

Such an acyl group is introduced by reacting a fiber having, in a molecule, a functional group, which is reactive with an acid anhydride group having a reactive double bond, and further reacting the reaction product with a metal chelate-forming compound, as described hereinafter.

On introduction of the acyl group, there is employed a method of introducing an acid anhydride into a functional group in a fiber molecule, and adding a metal chelate-forming compound to a reactive double bond contained in the acid anhydride. When using an intramolecular anhydride such as maleic anhydride as the acid anhydride, in case where the acid anhydride group reacts with the reactive functional group in the fiber molecule, one of them is converted into a carboxyl group, thereby to introduce an acyl group wherein a substituent V in the formulas [1] and [2] is a carboxyl group. On the other hand, when using an intermolecular anhydride such as acrylic anhydride as the acid anhydride, in case where the acid anhydride group reacts with the reactive functional group in the fiber molecule, one acid is eliminated, thereby to introduce an acyl group wherein a substituent V in the formulas [1] and [2] is hydrogen.

The substituent V in the formulas [1] and [2] varies depending on the case where the acid anhydride to be used first to introduce the acyl group into the fiber molecule is an intramolecular anhydride or intermolecular anhydride. According to the latter method, i.e. method using the intramolecular anhydride, carboxylic acid component is eliminated and consumed wastefully on introduction of the fiber molecule. To the contrary, according to the former method, i.e. method using the intermolecular anhydride, the acyl group and carboxyl group having a high chelate-forming capability can be introduced simultaneously into the fiber molecule, which is preferred.

As the metal chelate-forming compound to be added to the reactive double bond in the introduced acid anhydride group after introducing the acid anhydride into the fiber molecule, for example, there can be used various compounds which have an addition reactivity with the reactive double bond and also contain N or S having a metal chelate-forming property in the molecule. Among them, a compound having one or more carboxyl groups, together with N or S, is particularly preferred.

The metal chelate-forming fiber thus obtained has a metal chelate-forming functional group in a molecule, and a carboxyl group, nitrogen atom, sulfur atom and carboxylic acid contained in the metal chelate-forming functional group exhibit an excellent chelate-forming capability with heavy metal ions such as copper, zinc, nickel, cobalt, etc. and the metal chelate-forming functional group is exposed on the surface of the fiber. Therefore, the metal chelate-forming functional group exhibits an excellent metal ion-capturing property.

In the present invention, the kind of the base fiber, to which the metal chelate-forming capability is imparted, is not specifically limited and, for example, there can be used various vegetables fibers including cotton, hemp, etc.; various animal fibers including silk, wool, etc.; regenerated fibers including viscose rayon, etc.; and synthetic fibers including polyamide, acryl, polyester, etc. These fibers may also be those which are modified, if necessary.

Among these base fibers, vegetable and regenerated fibers have, in a molecule, a hydroxyl group, while animal fibers have, in a molecule, an amino group. Since these groups act as a functional group, which is reactive with an acid anhydride group, these fibers can be effectively utilized as a base fiber without requiring noticeable modification. In some case, it is also effective to enhance the reactive activity with the acid anhydride group by further modifying these fibers. When a functional group, which is reactive with the acid anhydride group, is not contained in the fiber molecule, reactive functional groups such as hydroxyl group, amino group, imino group, glycidyl group, isocyanate group, aziridinyl group, thiol group, etc. may be introduced by any method. By this method, any fibers can be effectively utilized.

The form of the above base fiber is not also specifically limited, and may be monofilament or multifilament of long fibers, spun yarn of short fibers, woven or knitted fabric produced by weaving or knitting them, and non-woven fabric or string. It is also possible to use fibers produced by using two or more kinds of fibers in combination, or a woven/knitted fabric or string thereof.

According to the process of the present invention, a metal chelate-forming capability is imparted to a fiber by reacting an acid anhydride having a reactive double bond with an reactive functional group in a fiber molecule to introduce a reactive double bond into the fiber molecule, and reacting a metal chelate-forming compound with the reactive double bond, as described above.

The acid anhydride having a reactive double bond to be used herein may be any compound having, in a molecule, an acid anhydride group and a reactive double bond, and preferred specific examples thereof include maleic anhydride, itaconic anhydride, aconitic anhydride, citraconic anhydride, maleic methyl cyclohexene tetracarboxylic anhydride, endo methylenetetrahydrophthalic anhydride, chlorendic anhydride, crotonic anhydride, acrylic anhydride, methacrylic anhydride and the like. Among them, an intramolecular anhydride of dibasic acid is particularly preferred for the reason described above. In view of the reaction efficiency and cost on introduction into the fiber molecule, maleic anhydride and itaconic anhydride are particularly preferred.

When the acid anhydride having a reactive double bond is reacted with the fiber in a polar solvent such as N,N'- dimethylformamide, dimethyl sulfoxide, etc. at about 60–100° C. for 30 minutes to several hours, if necessary, using a reaction catalyst, the reactive functional group in the fiber molecule is bonded with the acid anhydride group as a result of the reaction, thereby to introduce a group having a reactive double bond into the fiber molecule.

Then, when a metal chelate-forming compound is reacted with the fiber, into which the reactive double bond is introduced, the metal chelate-forming compound is added in the form of a pendant in the fiber molecule, thereby to impart a metal chelate-forming capability to the fiber.

As the metal chelate-forming compound, for example, there can be used a compound which has, in a molecule, a functional group having reactivity with a reactive double bond. Particularly preferred functional group having reactivity with the reactive double bond includes amino group, imino group and thiol group, and these groups react easily with the reactive double bond and N or S in these groups exhibit a metal chelate-forming capability. When using the intramolecular acid anhydride, one carboxyl group is introduced simultaneously in the step of adding to the fiber molecule, as described above, and also exhibits a metal chelate-forming capability.

Since the carbonyl group is introduced and exhibits a metal chelate-forming capability, together with N or S, the presence of the carboxyl group in the metal chelate-forming compound itself is not essential. The chelate-forming capability is effectively exhibited by an interaction between N or S and a carboxyl group, which coexist in the same molecule, and therefore a compound having, in a molecule, at least one group selected from the group consisting of amino group, imino group and thiol group, together with carboxyl group is preferably used as the metal chelate-forming compound.

Specific examples of the metal chelate-forming compound having, in a molecule, at least one group selected from the group consisting of amino group, imino group and thiol group include polyamines such as ethylenediamine, diethylenetriamine, triethylenetetramine, tetraethylenepentamine, pentaethylenehexamine, etc.; monoamines such as ethylamine, propylamine, butylamine, diethylamine, dibutylamine, monoethanolamine, diethanolamine, etc.; and thiols such as 2-mertcaptoethanol, thioglycerin, thiophenol, etc. Examples of the metal chelate-forming compound having a carboxyl group in combination include amino acid such as glycine, alanine, aspargic acid, glutamic acid, etc., iminodiacetic acid, iminodisuccinic acid, ethylenediaminediacetic acid, ethylenediaminetriacetic acid, ethylenediaminedisuccinic acid, thioglycolic acid, thiomalic acid, thiosalicylic acid, mercaptopropionic acid, etc. Among them, iminodiacetic acid and thiomalic acid are particularly preferred.

The method of reacting the metal chelate-forming compound with the fiber, into which an acid anhydride having a double bond is introduced, is not specifically limited, but may be a method of reacting the fiber with the metal chelate-forming compound in water or a polar solvent such as N,N'-dimethylformamide, dimethyl sulfoxide, etc. at about 10–100° C. for 30 minutes to several hours, if necessary, using a reaction catalyst. As a result of this reaction, the reactive double bond introduced into the fiber molecule is reacted with the amino group, imino group or thiol group, thereby to introduce a metal chelate-forming group into the fiber molecule in the form of a pendant.

As shown in the following scheme, typical examples of such a reaction will be specifically illustrated with respect to the case where cotton is used as the fiber, maleic anhydride is used as the acid anhydride, and iminodiacetic acid, ethylenediaminediacetic acid, ethylenediaminedisuccinic acid, iminodisuccinic acid, thioglycolic acid or thiomalic acid is used as the metal chelate-forming compound, respectively.

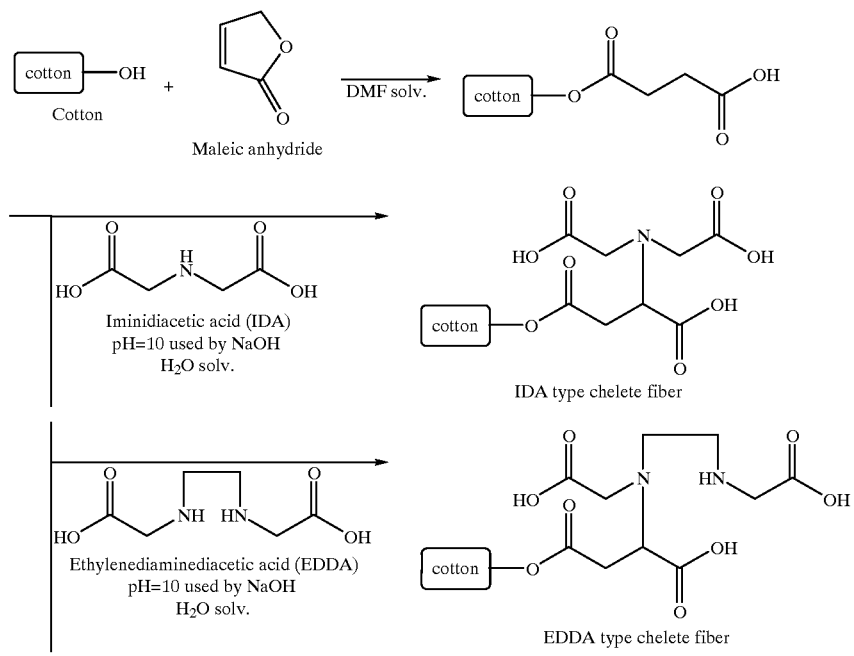

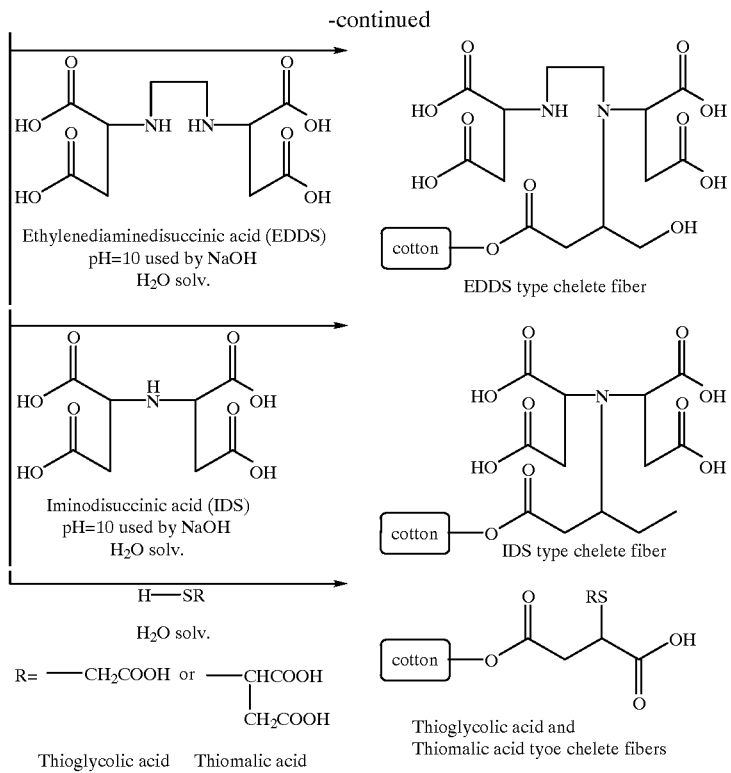

In the above scheme, the case where a hydroxyl group in a fiber molecule is reacted with an acid anhydride was typically illustrated, but the case where other reactive functional groups such as amino group, imino group, glycidyl group, isocyanate group, aziridinyl group, thiol group, etc. in the fiber molecule are utilized may be considered in the same manner and the case where the acid anhydride other than maleic anhydride is utilized may also be considered in the same manner. Furthermore, the case where compounds other than those mentioned above are used as the metal chelate-forming compound which is allowed to react with the reactive double bond to be introduced by the addition of the anhydride may also be considered in the same manner.

That is, the kind of the acyl group represented by the formula [1] or [2] to be introduced into the chelate fiber according to the present invention can vary widely depending on the combination of the acid anhydride and metal chelate-forming compound used in the production of the acyl group. Accordingly, the acyl group includes various acyl groups mentioned below, in addition to those shown in the above formulas.

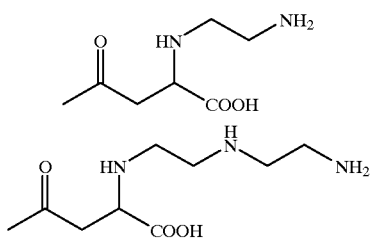

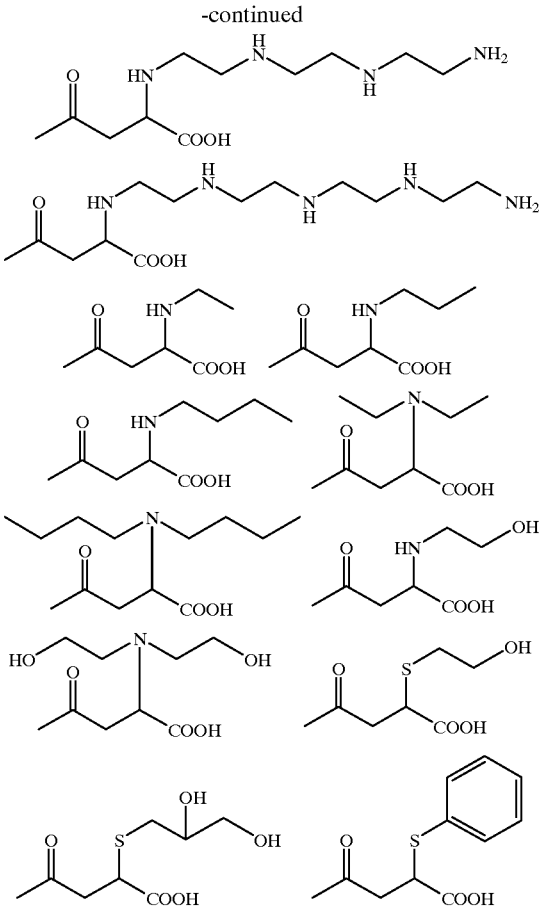

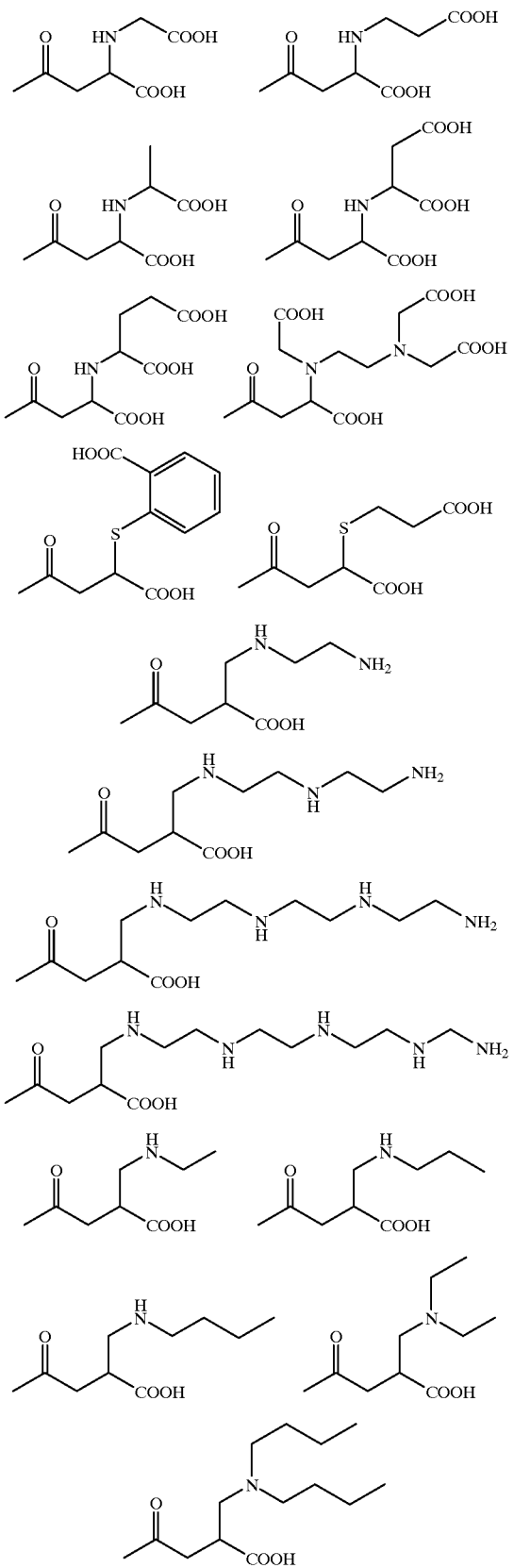
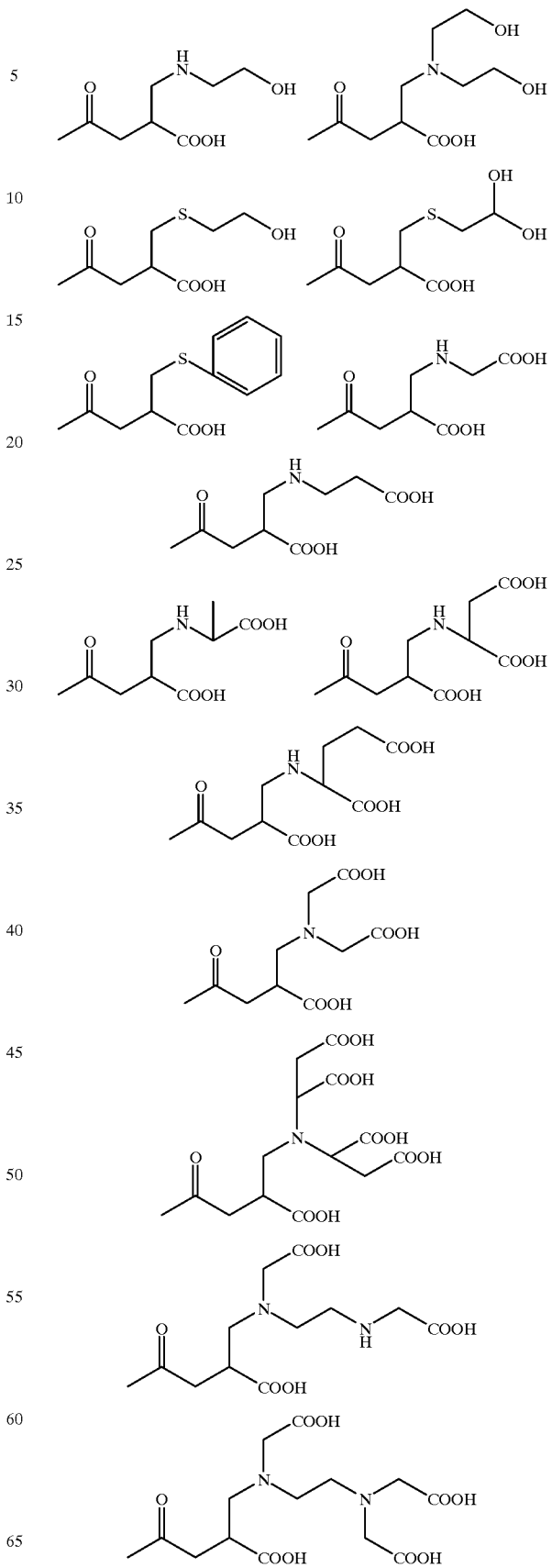

-continued

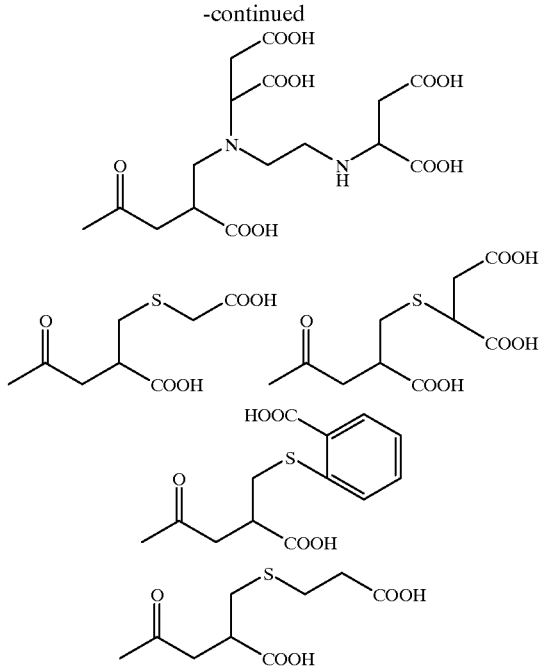

In the present invention, the reaction between the fiber and the acid anhydride and the reaction between the fiber and the metal chelate-forming compound are usually conducted successively in the manner as described above, but the introduction of the reactive double bond and reaction on introduction of the metal chelate-forming compound can also be conducted simultaneously by coexistence of the acid anhydride and metal chelate-forming compound with the fiber according to the reaction system.

The amount of the metal chelate-forming functional group to be introduced into the fiber can be optionally controlled by the amount of the reactive functional groups in the fiber molecule, the amount of the acid anhydride used in the above reaction on introduction, the amount of the metal chelate-forming compound or the reaction conditions. To impart sufficient metal chelate-forming capability to the fiber, the amount is preferably controlled so that the substitution rate calculated by the following equation becomes 5% by weight or more, more preferably 10% by weight or more.

Substitution rate (% by weight)=[(weight of fiber after introduction of metal chelate-forming functional group−weight of fiber after reaction with acid anhydride)/(weight of fiber after reaction with acid anhydride)]×100

To enhance the metal chelate-forming capability, the higher the above substitution rate, the better. Accordingly, the upper limit of the substitution rate is not specifically limited. When the substitution rate becomes too high, the crystallizability of the substituent-introduced fiber is enhanced and the fiber tends to become weak. Furthermore, when using the chelate resin as a filtering material or filter for removing or capturing metal, a pressure loss tends to increase. Therefore, the substitution rate is preferably about 100% by weight or less, more preferably about 50% by weight or less, synthetically considering utility as the metal chlete-forming fiber and economical efficiency. According to the functional group and acid anhydride compound in the fiber molecule, the kind of the metal chelate-forming compound, and purposes, the metal chelate-forming capability can also be enhanced by controlling to high substitution rate such as 100–200% by weight.

The metal chelate-forming fiber obtained as described above can be obtained in the form of monofilament, multifilament, spun yarn, non-woven fabric, woven or knitted fabric, or string, which has any properties, according to the properties of the base fiber to be used. Any way, since substantially all of the above-described groups having the metal chelate-forming property introduced into the molecular surface of the fiber having a fine diameter effectively exhibit the metal chelate-forming capability, the metal chelate-forming fiber exhibits a noticeably superior metal capturing rate than that of those having a conventional resin capturing material. Moreover, this fiber exhibits an excellent metal ion-capturing capability, particularly excellent capturing capability to heavy metal ions, even in neutral and low pH range or even when applied to water having a low metal ion concentration to be treated, as it is made clear in examples described hereinafter.

That is, according to the present invention, the following better advantages than those of a conventional chelate resin are given by taking the form of the fiber.

(1) A conventional chelate resin forms a chelate on the granular surface and pore portions. However, since diffusion rate of the pore portion is low and substantially all functional groups can not contribute to chelate capturing, effective utilization rate of the whole chelate resin is considerably low and the absolute amount of elements, which can be captured, becomes insufficient necessarily. In the present invention, since all of the chelate-forming functional groups introduced into the fiber surface are effectively utilized for chelate capturing of the metals, considerably high chelate capturing capability can be obtained by using it in a small amount.

(2) Moreover, in a conventional chelate resin, since diffusion in the pore portion proceeds slowly as described in the above item (1), a sufficient capturing effect can not be obtained without contacting the granular chelate resin with the solution to be treated for considerably long time. When the particle diameter is decreased excessively to enlarge substantially effective specific surface area, a loss in pressure becomes large and, therefore, it can not be utilized substantially for removing metals in the gas. However, according to the chelate-forming fiber of the present invention, high contact efficiency can be easily obtained even in the case of the gas because of its large effective surface area. If the fiber-packed layer is increased, if necessary, a trace amount of metal components contained in the gas can be efficiently captured.

(3) For the reason as described in the above item (2), a conventional chelate resin can be substantially utilized only for capturing metals in the liquid. However, the chelate-forming fiber of the present invention can be effectively used for not only the liquid, but also metal components contained in the gas, such as air, exhaust gas, etc., by making use of its excellent specific surface area.

(4) Since a chelate-forming functional group is exposed to the fiber surface, an adsorption rate is high and a breakthrough curve shows good steep rising.

(5) On drying, a conventional chelate resin generally becomes weak and is converted into fine powder and, therefore, it becomes impossible to put to practical use. Since the chelate fiber of the present invention does not becomes brittle on drying because a chelate-forming functional group is introduced into the fiber material.

(6) In the case of a conventional chelate resin, the form on use is limited according to the shape of a packing container. However, a chelate resin can be used in any form by converting into the form of a non-woven fabric or a woven/knitted fabric, or a string.

(7) In the case of a conventional chelate resin, the porosity is automatically decided by the particle diameter. However, in the case of a chelate fiber, the packing density (apparent density) can be optionally modified and the porosity can be freely controlled.

(8) When a metal component is captured as described above using the chelate-forming fiber of the present invention and then treated with an aqueous strong acid solution such as hydrochloric acid, sulfuric acid, etc., metal captured after forming a chelate can be easily eliminated, thereby making it possible to easily regenerate and to effectively recover the component as a valuable component from the regenerated solution.

Accordingly, when this fiber is brought into contact with a liquid containing the irrigation water containing heavy metals, specifically the fiber is layered in an optional thickness, or packed in a column and penetrated with a liquid to be treated, heavy metal ions contained in the liquid to be treated can be effifiently captured and the liquid to be treated is purified and, moreover, the heavy metal component can be effectively removed from the liquid to be treated.

Furthermore, the chelate-forming fiber of the present invention can be effectively utilized for not only removal of metal ions from an aqueous liquid, but also removal of metal from the following aqueous liquid, or gas such as waste gas.

a. Removal of metals from various edible oils and fats or fatty acids:

Compounds containing metal elements in a molecule, e.g. hemoglobin of animals or chlorophyll of plants as a production source, are included in edible oils and fats or fatty acids sometimes, or a trace amount of metals is often included in a modification step and it is confirmed that these metals accelerate deterioration of the edible oils and fats or fatty acids due to oxidation. When using the chelate-forming fiber of the present invention, a trace amount of these metals can be captured as a chelate, thereby making it possible to prevent deterioration of the edible oils and fats or fatty acids.

b. Removal of metals from industrial oils such as cutting oil, lubricant oil, etc.

A trace amount of metals derived from metal catalysts used in the production or modification is also included in these industrial oils sometimes, and it is also known that a trace amount of these metals accelerate deterioration due to oxidation. The chelate-forming fiber of the present invention can also be utilized effectively to remove metals from these industrial oils.

c. Removal of metals from various organic solvents or polymerizable monomer components A trace amount of metals derived from metal compounds as a catalysts for decomposition, oxidation or reduction used in the production step is also included sometimes, and these metals exert an adverse influence on a solute or a trace amount of metals causes an unexpected damage sometimes when using to wash precision parts such as electronic materials, semiconductors, etc. A trace amount of metals, which are included in the polymerizable monomer, causes abnormal caulking sometimes. When using the chelate-forming fiber of the present invention, a trace amount of metals can be removed from these organic solvents or polymerizable monomers d. Removal from various liquid resins When using resins as paint, film, electronic insulating material, etc., a trace amount of metals, which are included in the liquid resin, accelerates discoloration or deterioration of physical properties or inhibits an insulating property as the electronic insulating material after curing the resin sometimes. When using the chelate-forming fiber of the present invention, a trace amount of metals can be removed effectively from these polymer materials, thereby making it possible to prevent the damage described above.

e. Removal of metals in gas

A trace amount of metals is included in an exhaust gas from an equipment for treatment of heavy metals and causes an environmental pollution sometimes. In the case of an air-conditioning equipment of a clean room, such as equipment for treatment of semiconductor, inclusion of a trace amount of metal ions causes deterioration of quality. When utilizing the chelate-forming fiber of the present invention, these metals can also be captured and removed efficiently.

In the above description, an example of utilizing the metal chelate-forming fiber only for capturing a chelate of metals was described. However, when a filter is made by using the metal chelate-forming fiber of the present invention and the fluid described above is treated by using the filter, not only the metal component in the fluid to be treated can be captured as a chelate, but also fine insoluble impurities which are included in a solid state can be removed, thereby making it possible to further promote purification of the fluid to be treated. Therefore, it is preferred.

The construction of the filter (the term "filter" used in the present invention refers to a filter member or a filter equipment to which the filter member is assembled) itself is not special noticeably, and can be formed in the same manner as in case of filters having all known structures, for example, structure obtained by using the above metal chelate-forming fiber as a portion or whole constituent material according to the purpose, forming the material into a mat having a single- or multi-layer structure made of a woven/knitted or non-woven fabric having any space between fibers and assembling the mat to a suitable substrate, structure obtained by winding a string of a chelate-forming fiber around an air-permeable substrate cylinder in a twill pattern several times, structure obtained by folding a woven/knitted fabric or non-woven sheet made of the same fiber in a pleats pattern and assembling the resultant to a substrate member, bag filter obtained by forming a woven/knitted fabric made by using the same fiber into a bag and the like.

All filter materials may be also composed of the above chelate-forming fiber, or a purification effect can also be enhanced at a comparatively low cost by using the chelate-forming fiber in combination with a normal filter material for filtration in a proper ratio according to the content of a ratio of insoluble impurities/metals contained in the fluid to be treated (lamination).

Using a fiber to which a metal chelate-forming capability is previously imparted by the method described above, filters having various structures described above can be formed after forming the fiber into a woven/knitted fabric, non-woven fabric or string. Alternatively, a filter material of a fiber having a functional group in a molecular, which is reactive with an acid anhydride, is assembled to a filter and then a metal chelate-forming capability can also be imparted to the filter material by reacting with an acid anhydride having a reactive double bond and further reacting with a metal chelate-forming compound.

EXAMPLES

The examples of the present invention will be illustrated but the present invention is not limited to the following examples, and modifications can be made without departing from the purports described hereinabove and hereinafter and are also included in the technical scope of the present invention.

Example 1

(Production of Chelate Fiber A)

In a solution prepared by dissolving 50 g of maleic anhydride in 100 ml of N,N'-dimethylformamide, 1.0 g of a cotton fabric (unbleached cotton unit) was dipped and subjected to a heat treatment at 80° C. for 10 hours. Then, the heat-treated cotton fabric was washed with acetone and distilled water, dehydrated and dried at 20° C. for 15 hours to obtain 1.23 g of a fiber, into which a reactive double bond is introduced.

To a solution prepared by adding 20.2 g of iminodiacetic acid to 100 ml of distilled water and adjusting to pH 10 using sodium hydroxide, the above fiber into which a reactive double bond is introduced was dipped and subjected to a heat treatment at 25° C. for 15 hours. Then, the treated fiber was sufficiently washed with distilled water, dehydrated and dried at 20° C. for 15 hours to obtain 1.49 g of a fiber (chelate fiber A: substitution rate of 21.1%) having a metal chelate-forming capability.

0.1 g of the resulting chelate fiber A was added to 50 ml of an aqueous diluted sulfuric acid solution containing copper, zinc, nickel and cobalt (5 mmol/l each) wherein the pH is adjusted within a range from 2 to 7 and, after stirring at 20° C. for 20 hours, a decrease in amount of each metal ion was examined.

The results are as shown in FIG. 1. As is apparent from FIG. 1, this chelate fiber A has an excellent capturing performance to any metal ions of copper, zinc, nickel and cobalt and exhibits a high adsorption activity in a neutral range as well as a low pH range. As is also apparent from FIG. 1, since the adsorption activity of the chelate fiber A varies considerably depending on the kind of the metal ion, it becomes possible to capture dissolved metal ions selectively in the order of decreasing adsorption activity by positively utilizing a difference in adsorption activity, for example, by capturing selectively copper having a highest adsorption activity and then capturing nickel, zinc and cobalt in order.

Example 2
(Production of Chelate Fiber B)

In a solution prepared by dissolving 20 g of thiomalic acid in 100 ml of distilled water, 1.0 g of a fiber into which a reactive double bond is introduced in the same manner as in Example 1 was dipped and subjected to a heat treatment at 60° C. for 10 hours. Then, the heat-treated cotton fabric was sufficiently washed with distilled water, dehydrated and dried at 20° C. for 15 hours to obtain 1.23 g of a fiber (chelate fiber B: substitution rate of 23.1%) into which a reactive double bond is introduced.

Figure 2:
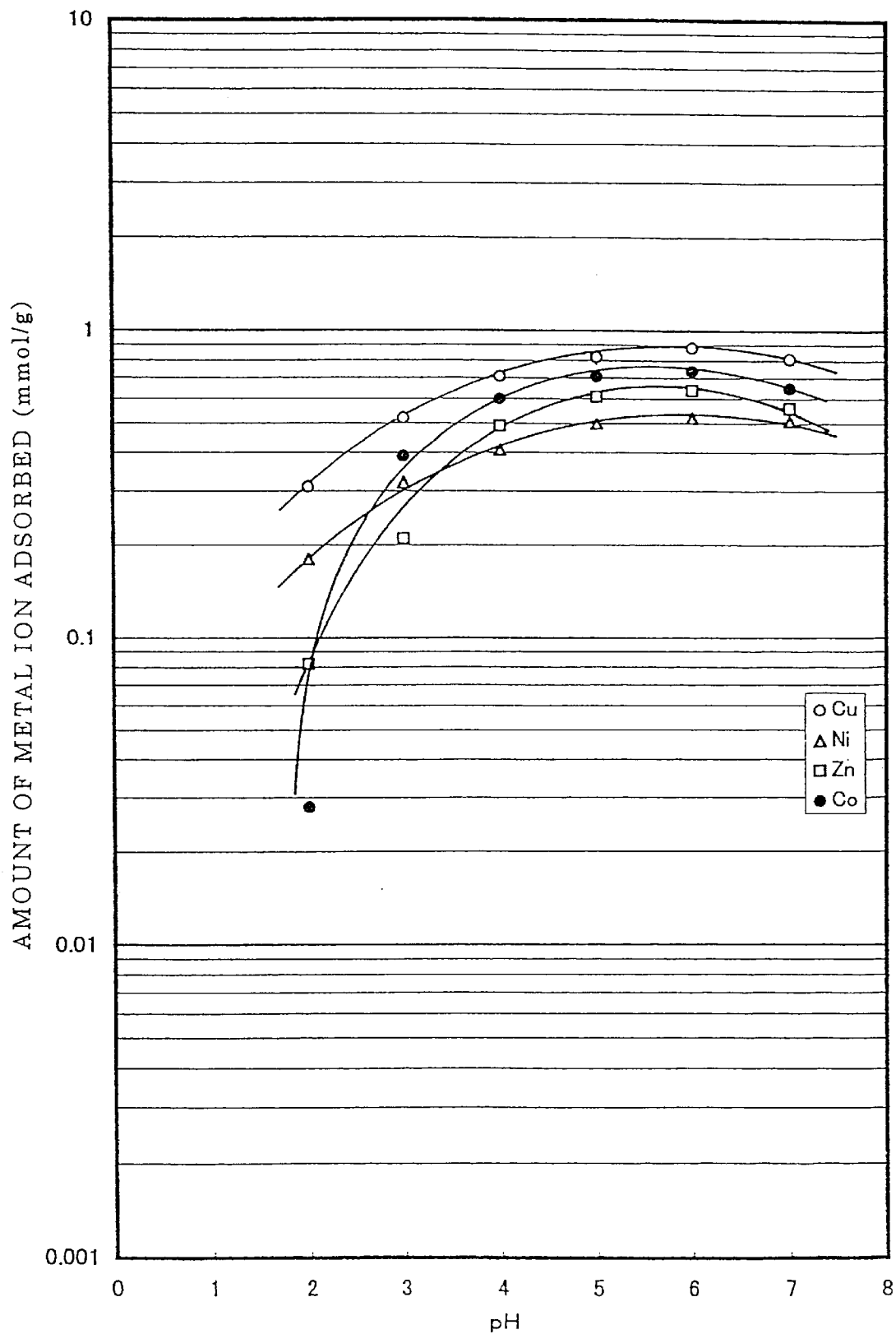
FIG. 2 is a graph showing the results of a metal ion selective capturing test of the chelate fiber B obtained in the example.

Using the resulting chelate fiber B, an adsorption capturing test was conducted in the same procedure as in Example 1. The results shown in FIG. 2 were obtained. As is apparent from FIG. 2, this chelate fiber B also has an excellent capturing performance to any metal ions of copper, zinc, nickel and cobalt and exhibits a high adsorption activity in a neutral range as well as a low pH range. Since the adsorption activity of the chelate fiber B also varies considerably depending on the kind of the metal ion, the chelate fiber can be utilized to selectively capture dissolved metal ions in the same procedure as in case of the chelate resin A.

Comparative Example 1

Figure 3:
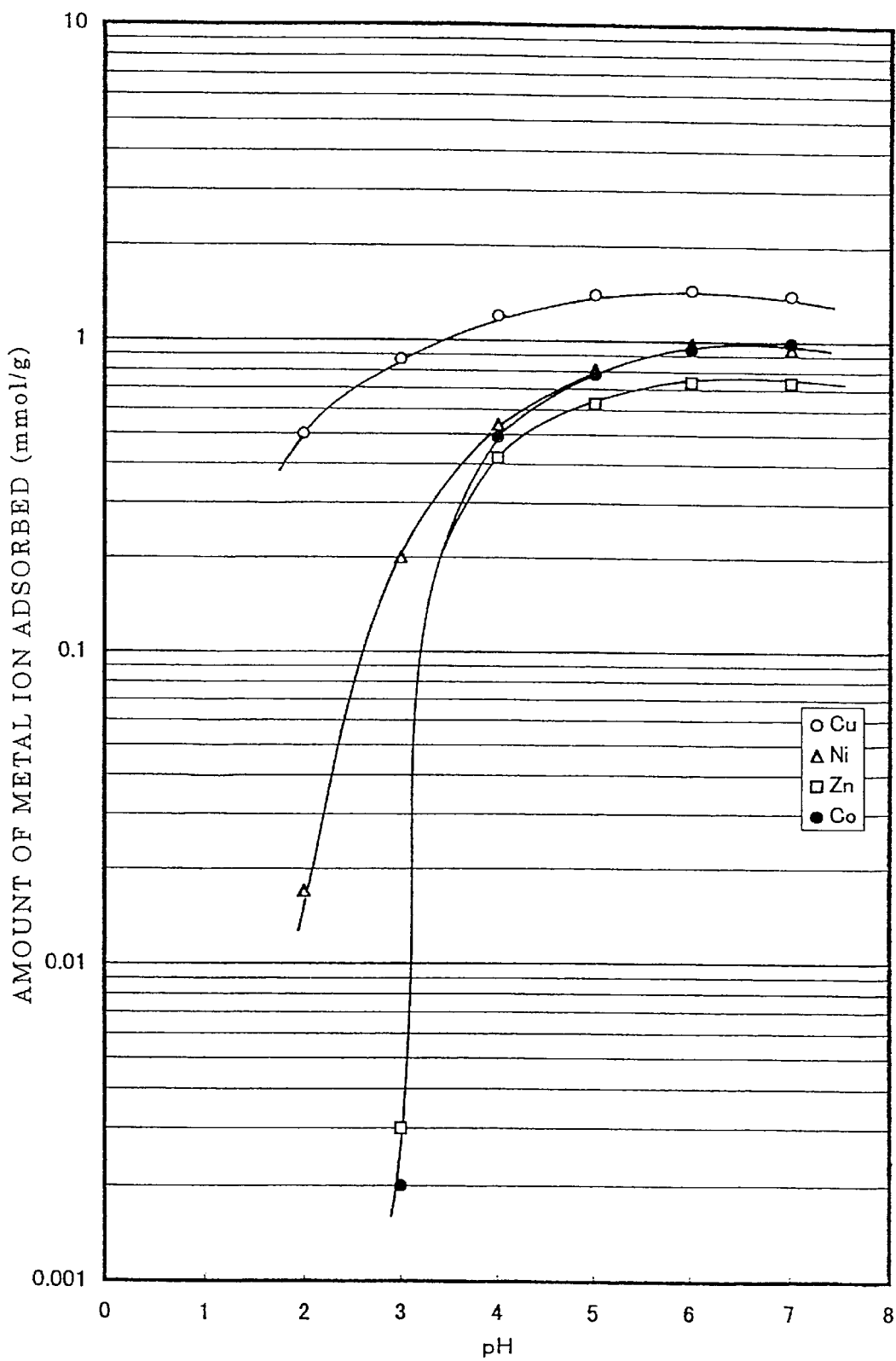
FIG. 3 is a graph showing the results of a metal ion selective capturing test of a commercially available beads-like chelate resin.

Using a commercially available beads-like styrene-iminodiacetic acid chelate resin (manufactured by Mitsubishi Chemical Co. under the trade name of "Dia Ion CR11"), an adsorption test was conducted in the same procedure as in Example 1. The results are as shown in FIG. 3. The copper ion can be adsorbed and captured even at about pH 2, while satisfactory adsorption and capturing effect can not be obtained with respect to nickel, zinc and cobalt even if the pH is not within a range from 3 to 4. Therefore, it has been found that the dependence of capturing of a chelate on pH is high.

Performance test (copper ion adsorption rate test)

To compare a metal ion adsorption rate of the metal chelate-forming fiber of the present invention with that of a commercially available chelate resin, 1 g (calculated based on solid content) of each of the chelate fiber A or B obtained above and the beads-like chelate resin used in Comparative Example 1 was swollen by dipping in distilled water at 25° C. for 15 hours. Then, copper sulfate was added so that the concentration of the copper ion becomes 50 ppm (total amount: 500 ml) and a change in copper ion concentration in the solution with elapsed time was examined.

Figure 4:
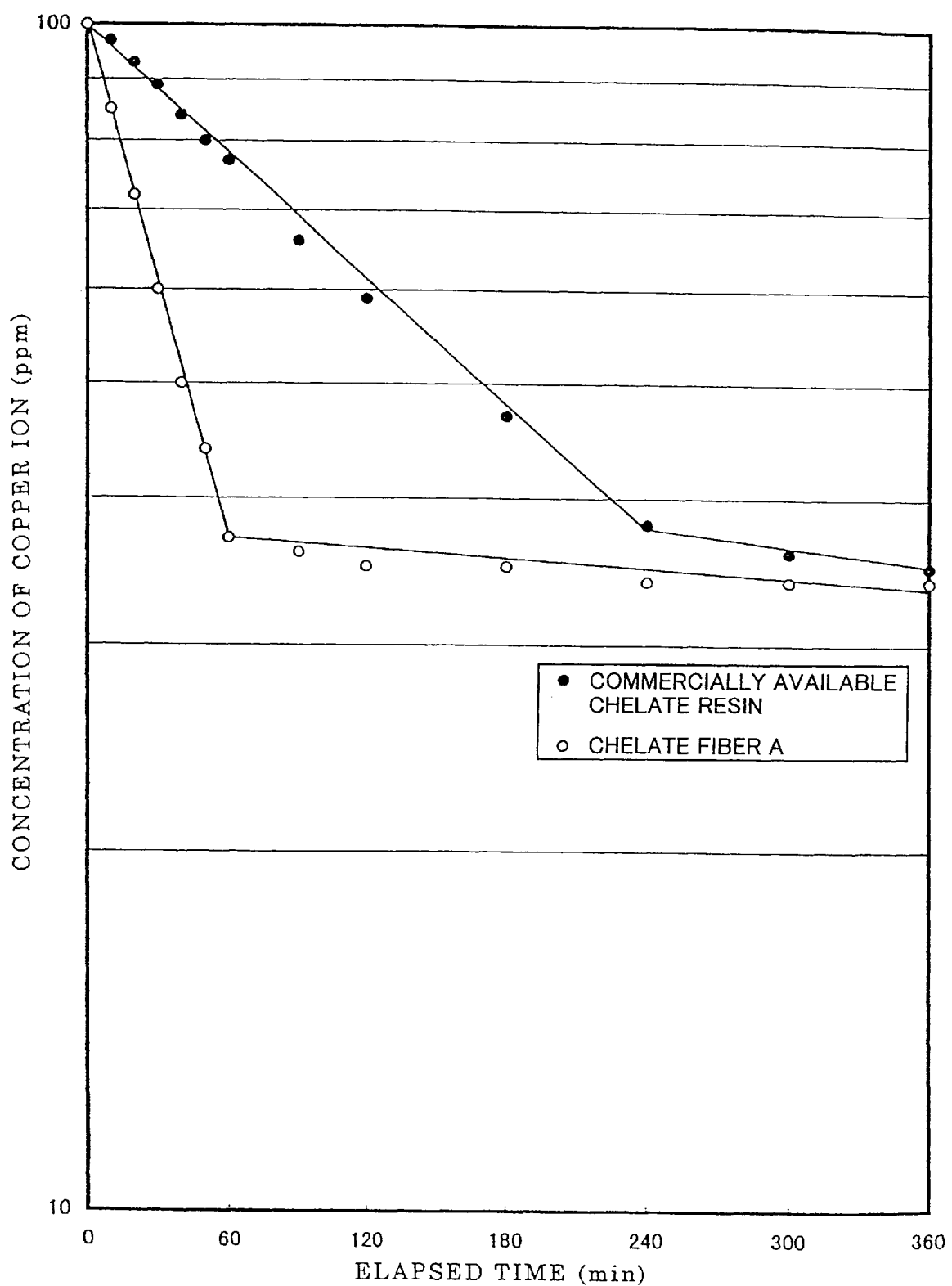
FIG. 4 is a graph showing a relation between the copper ion concentration and the capturing (adsorbing) rate of the chelate fiber A obtained in the example as compared with a commercially available beads-like chelate resin.
Figure 5:
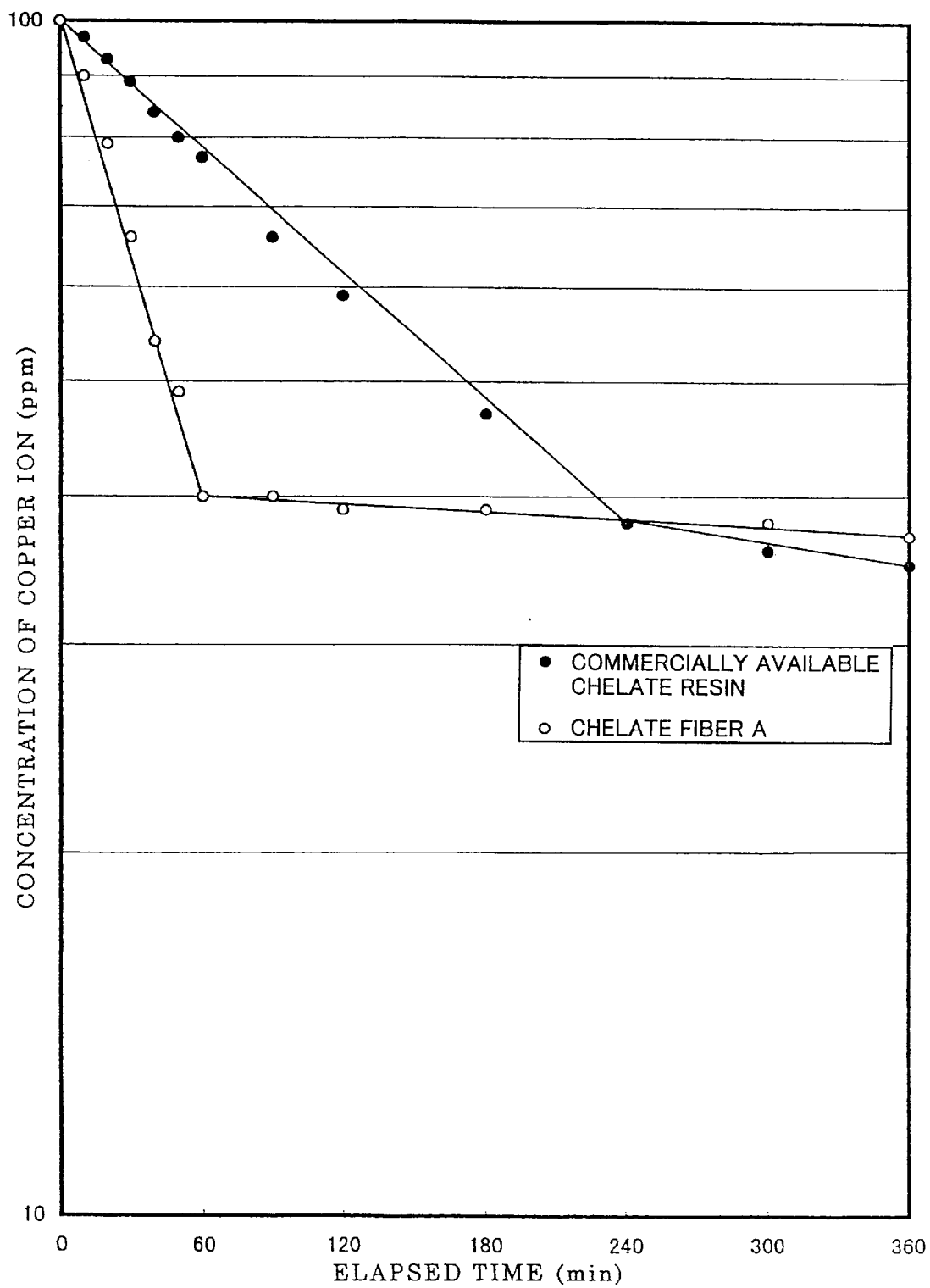
FIG. 5 is a graph showing a relation between the copper ion concentration and the capturing (adsorbing) rate of the chelate fiber B obtained in the example as compared with a commercially available beads-like chelate resin.

The results are as shown in FIGS. 4 and 5. In case where the commercially available beads-like chelate resin is used, it takes about 4 hours until the amount of the copper ion captured is saturated. When using the chelate fiber A or B of the present invention, it takes about one hour until the amount of the copper ion is almost saturated. Therefore, it has been found that the chelate fiber of the present invention has an absorption capturing rate which is about four times as that of the commercially available beads-like chelate resin.

Example 3
(Filter Made of Chelate-forming Fiber and Performance Thereof)

A commercially available cartridge filter (manufactured by Advantic Co. under the trade name of "TCW-1-CSS", nominal pore size: 1 µm) produced by winding a spun yarn made of cotton around a core material made of stainless steel in a twill pattern was mounted to a housing made of stainless steel (manufactured by Advantic Toyo Co. under the trade name of "1TS") and a solution prepared by dissolving 1000 g of maleic anhydride in 1000 ml of N,N'-diemthylformamide was circulated therein at 80° C. at a flow rate of 15 liter/minute for 10 hours, using a circulating pump, thereby to introduce a reactive double bond into a cotton spun yarn molecule. After the reaction solution was discharged, the filter was washed by circulating 3000 ml of an aqueous 30% acetone solution and 3000 ml of distilled water in order.

Then, a solution prepared by adding 500 g of iminodiacetic acid (metal chelate-forming compound) to 2000 ml of distilled water and adjusting to pH 10 using sodium hydroxide was circulated through the filter having reactive double bond at 25° C. for 15 hours, thereby to introduce a metal chelate-forming functional group into the cotton spun yarn constituting the filter. Then, circulation and discharge of the waste solution were repeated using distilled water until the cleaning solution becomes neutral to obtain a metal chelate-forming filter.

The metal chelate-forming filter was mounted to a housing made of polypropylene (manufactured by Advantic Toyo Co. under the trade name of "1PP-1-FS-000") and a test solution prepared by dispersing 1.56 g of fine silicon dioxide powders as insoluble impurities having a particle diameter of 10 µm in 10 liter of an aqueous diluted sulfuric acid solution containing Cu, Zn, Ni and Co (50 ml each) where the pH is adjusted to pH 3 and circulated therein at 25° C. at a flow rate of 15 liter/minute for 30 minutes.

Then, each concentration of metal ions ($Cu^{2+}$, $Zn^{2+}$, $Ni^{2+}$ and $Co^{2+}$) remained in the test solution was determined. As a result, it has been confirmed that any of metal ions was reduced to 1 ppm or less. 1 liter of the test solution was passed through a membrane filter having a pore size of 0.1 µm and a removal percentage was determined by measuring the residual amount of silicon dioxide. As a result, it has been confirmed that the removal percentage is 97%.

Example 4

(Removal of Metals from Oils and Fats)

0.5 g of the chelate resin produced in Example 1 was dipped in 50 ml of soybean oil containing 634 ppb of Cu, 57 ppb of Ni, 13 ppb of Mn and 990 ppb of Fe and, after stirring at 25° C. for 16 hours, the residual amount of each metal in soybean oil was measured. As a result, Cu was reduced to 5 ppb or less, while any of Ni, Mn and Fe was reduced to 10 ppb or less.

Example 5

The chelate fiber A obtained in Example 1 and the same beads-like styrene-iminodiacetic acid chelate resin as that used in Comparative Example 1 (4 g each) were separately charged in a glass column having a diameter of 10 mm and an aqueous copper nitrate solution (10 mmol/l) was passed through each column at a flow rate of $SV=100\ hr^{-1}$ so that the copper ion concentration becomes 10 ppm. Then, each break-through curve was determined by measuring the copper ion concentration of the effluent.

Figure 6:
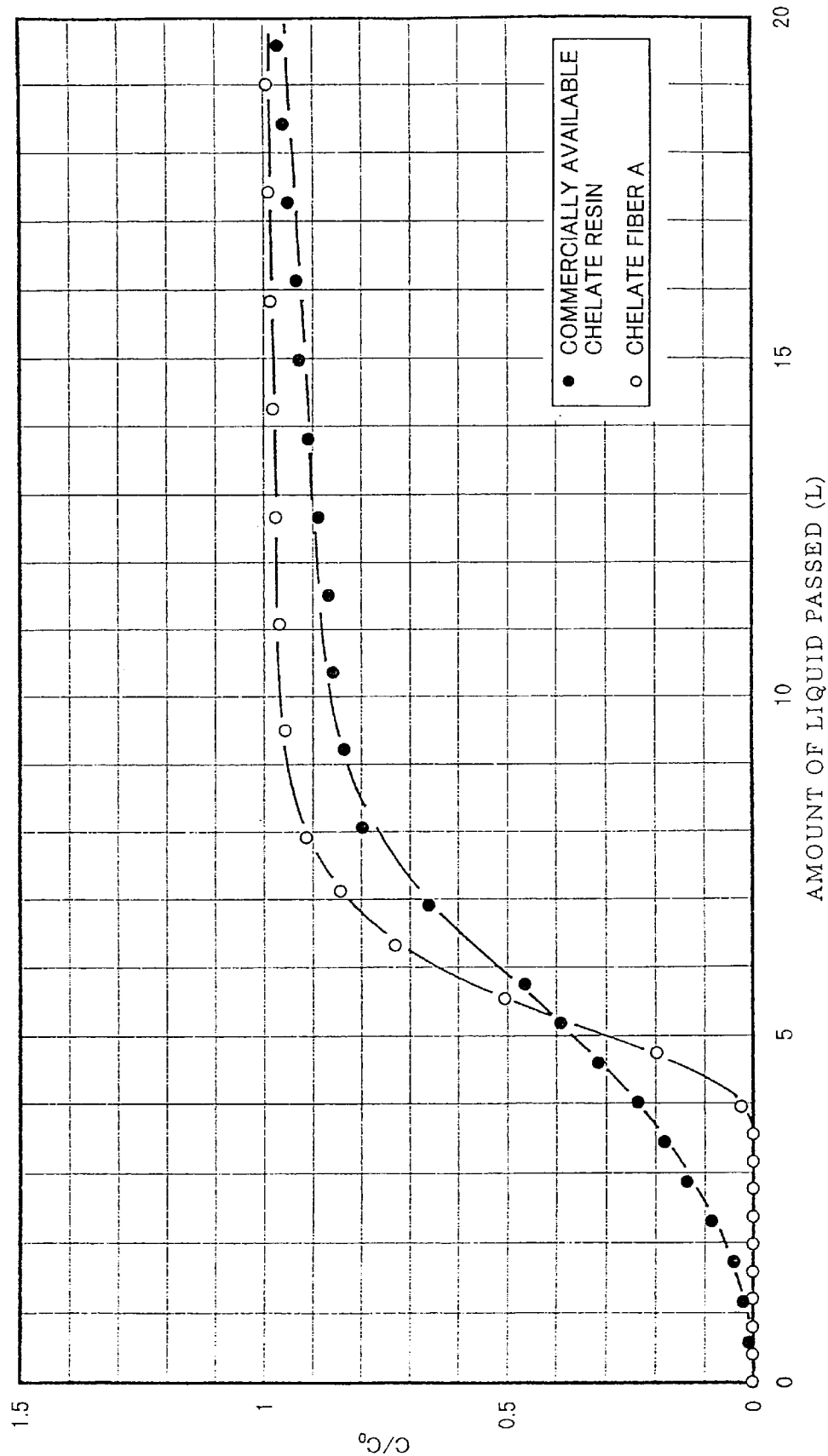
FIG. 6 is a graph showing a break-through curve of the chelate fiber A according to the present invention as compared with a commercially available beads-like chelate resin, when using copper ions as a subject for capturing a chelate.

The results are as shown in FIG. 6. When using the beads-like chelate resin, the copper ion effuses without being sufficiently captured by the beads-like resin. On the other hand, when using the chelate resin of the present invention, nearly complete metal-capturing capability is exhibited until the metal-capturing capability of the chelate fiber is saturated. As is apparent from these results, it can be confirmed that the chelate fiber of the present invention has an excellent metal ion-capturing capability.

Effect of the Invention

The present invention is constructed as described above. It became possible to provide a fiber having a metal ion-capturing performance by introducing a metal chelate-forming functional group represented by the formula [1] or [2]. The metal chelate-forming fiber can be introduced in a simple and efficient manner only by a heat treatment using a conventional polar solvent without requiring a special equipment such as ionizing radiation after reacting a reactive functional group in a fiber molecule with an acid anhydride having a reactive double bond to introduce a reactive double bond and reacting the reaction product with a metal chelate-forming compound.

The metal chelate-forming fiber of the present invention exhibits a superior metal ion-capturing capability than that of a conventional chelate resin, and can effectively remove metals contained in various fluids, for example, aqueous fluids including irrigation water, etc., non-aqueous liquids, and gases such as exhaust gas. Furthermore, any porous filter produced by using the metal chelate-forming fiber can remove not only metal ions but also insoluble impurities contained in a fluid to be treated, and can be utilized as a filter for purification of various fluids, very effectively.

What is claimed is:

1. A metal chelate-forming fiber which has, covalantly bonded to a fiber molecule, an acyl group represented by the following general formula [1] or [2]:

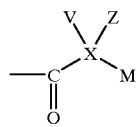

[1]

wherein X represents a residue in which one carboxyl group is eliminated from monocarboxylic acid or dicarboxylic acid;

V represents hydrogen or a carboxyl group;

Z represents hydrogen or has the same meaning as that of M, with the proviso that Z and M are the same or different M represents hydrogen; or

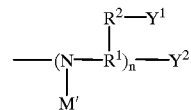

wherein $R^1$ represents a residue in which one hydrogen is eliminated from a carbon chain in an alkylene group; $R^2$ represents a direct bond or an alkylene group; $Y^1$ and $Y^2$ are the same or different and each represents hydrogen, a carboxyl group, an amino group, a hydroxy group or a thiol group; n is an integer of 1 to 4; M' represents hydrogen or

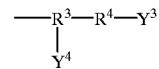

wherein $R^3$ represents a residue in which one hydrogen is eliminated from a carbon chain in an alkylene group; $R^4$ represents a direct bond or an alkylene group; $Y^3$ and $Y^4$ are the same or different and each represents hydrogen, a carboxyl group, an amino group, a hydroxy group or a thiol group;

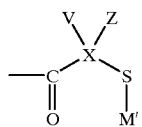

[2]

wherein V, X, Z and M' are as defined above.

2. The metal chelate-forming fiber according to claim 1, wherein the fiber is a natural fiber or a regenerated fiber.

3. The metal chelate-forming fiber according to claim 1, wherein the fiber is a synthetic fiber.

4. A process for preparing a metal chelate forming fiber, which comprises the steps of: reacting a reactive functional group in a fiber molecule with an acid anhydride group having a reactive double bond; and covalently bonding the reaction product to a metal chelate-forming compound.

5. The process according to claim 4, wherein the reactive functional group is at least one selected from the group consisting of hydroxyl group, amino group, imino group, glycidyl group, isocyanate group, aziridinyl group and thiol group.

6. The process according to claim 4, wherein the metal chelate forming compound is a compound having, in a molecule, at least one selected from the group consisting of amino group, imino group and thiol group, and a carboxyl group.

7. A method for capturing metal ions, which comprises the step of: bringing into contact with matter containing metal ions to capture the metal ions in the matter a metal chelate-forming fiber which has, in a fiber molecule, an acyl group represented by the following general formula [1] or [2]:

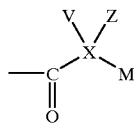

[1]

wherein X represents a residue in which one carboxyl group is eliminated from monocarboxylic acid or dicarboxylic acid;
V represents hydrogen or a carboxyl group;
Z represents hydrogen or has the same meaning as that of M, with the proviso that Z and M are the same or different;
M represents hydrogen; or

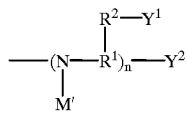

wherein $R^1$ represents a residue in which one hydrogen is eliminated from a carbon chain in an alkylene group; $R^2$ represents a direct bond or an alkylene group; $Y^1$ and $Y^2$ are the same or different and each represents hydrogen, a carboxyl group, an amino group, a hydroxy group or a thiol group; n is an integer of 1 to 4; M' represents hydrogen or

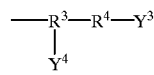

wherein $R^3$ represents a residue in which one hydrogen is eliminated from a carbon chain in an alkylene group; $R^4$ represents a direct bond or an alkylene group; $Y^3$ and $Y^4$ are the same or different and each represents hydrogen, a carboxyl group, an amino group, a hydroxy group or a thiol group;

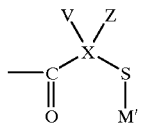

[2]

wherein V, X, Z and M' are as defined above.

8. The method according to claim 7, wherein the matter is water containing metal ions to capture the metal ions in water.

9. The method according to claim 7, wherein the matter is an oil containing metal ions to capture the metal ions in the oil.

10. The method according to claim 7, wherein the matter is a gas containing metal ions to capture the metal ions in the gas.

11. A filter for purification of a fluid, which comprises a metal chelate-forming fiber which has, in a fiber molecule, an acyl group represented by the following general formula [1] or [2]:

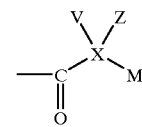

[1]

wherein X represents a residue in which one carboxyl group is eliminated from monocarboxylic acid or dicarboxylic acid;
V represents hydrogen or a carboxyl group;
Z represents hydrogen or has the same meaning as that of M, with the proviso that Z and M are the same or different;
M represents hydrogen; or

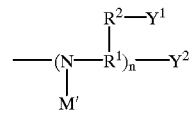

wherein $R^1$ represents a residue in which one hydrogen is eliminated from a carbon chain in an alkylene group; $R^2$ represents a direct bond or an alkylene group; $Y^1$ and $Y^2$ are the same or different and each represents hydrogen, a carboxyl group, an amino group, a hydroxy group or a thiol group; n is an integer of 1 to 4; M' represents hydrogen or

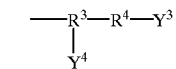

wherein $R^3$ represents a residue in which one hydrogen is eliminated from a carbon chain in an alkylene group; $R^4$ represents a direct bond or an alkylene group; $Y^3$ and $Y^4$ are the same or different and each represents hydrogen, a carboxyl group, an amino group, a hydroxy group or a thiol group;

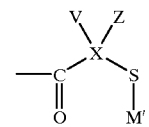

[2]

wherein V, X, Z and M' are as defined above.

* * * * *